H. G. SAAL.
SPRING MOTOR.
APPLICATION FILED NOV. 17, 1919.

1,393,167.

Patented Oct. 11, 1921.
2 SHEETS—SHEET 1.

Inventor
Henry G. Saal

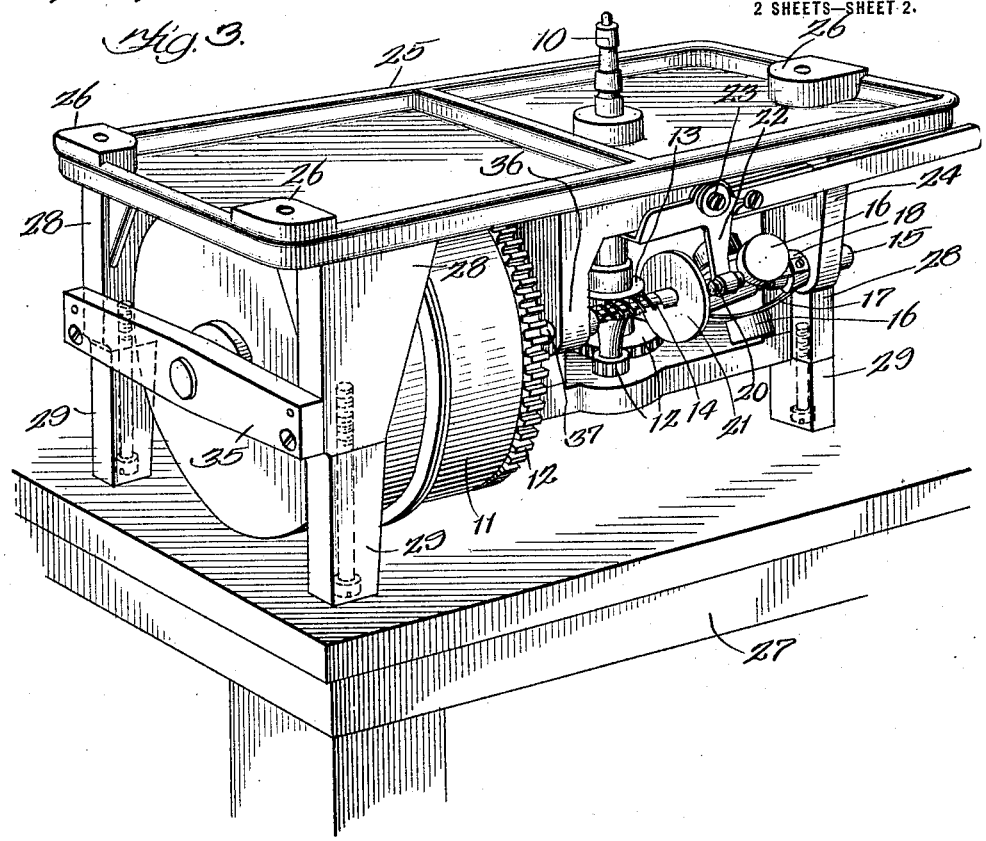
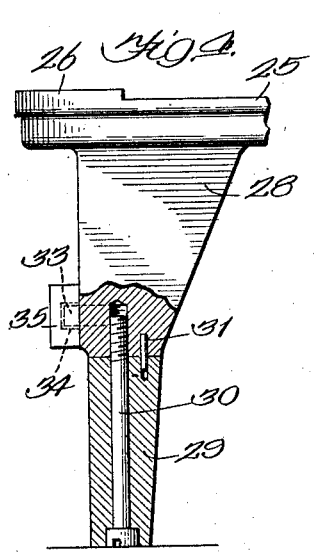
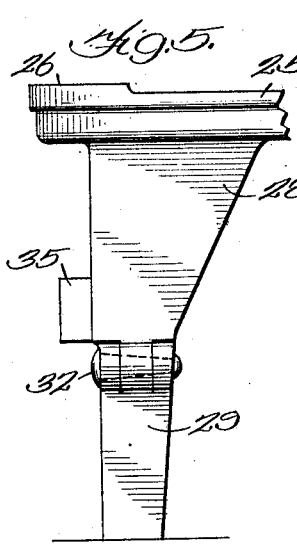
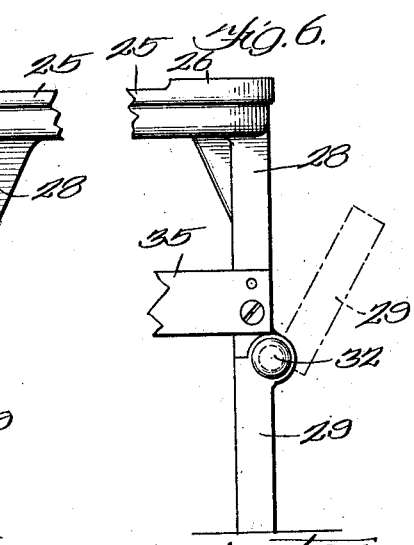

UNITED STATES PATENT OFFICE.

HENRY G. SAAL, OF CHICAGO, ILLINOIS.

SPRING-MOTOR.

1,393,167.  Specification of Letters Patent.  Patented Oct. 11, 1921.

Application filed November 17, 1919. Serial No. 338,554.

*To all whom it may concern:*

Be it known that I, HENRY G. SAAL, citizen of the United States, residing at Chicago, in the county of Cook and State of Illinois, have invented a certain new and useful Improvement in Spring-Motors, of which the following is a full, clear, concise, and exact description.

My invention relates to spring motors having incased coiled power storing springs and exposed gearing, such as are commonly employed for operating phonographs. These spring motors, in conjunction with speed controlling governors are mounted in frames which, in turn, are mounted upon suitable supports as, for example, supporting boards in the top portions of phonograph cabinets.

Manufacturers of phonographs usually obtain their spring motors from other manufacturers, these spring motors being suitably boxed for shipping. Special care has to be taken in boxing the motors to protect the exposed gearing thereof and other parts as well during the packaging and shipping. When these motors are received at their destinations they are unpacked and frequently are carelessly handled to such an extent that the gearing may become clogged by foreign matter and, along with other parts of the apparatus, may be actually injured by violent contact with the benches upon which they are placed after being removed from their boxes.

In accordance with my invention I provide the spring motor and the parts operating in conjunction therewith with a frame which is expended to support the parts carried thereby above the bottom level thereof to afford clearance between such parts and the bench or other support upon which they are temporarily located preparatory to their inclusion in a phonograph structure.

For the sake of lightness and to afford accessibility to the motor and other parts carried by the frame the downward extensions thereof are preferably in the form of three legs, two at one end of the frame and the other at the opposite end of the frame.

In phonographs of certain design one or more of these legs would prevent the proper location of the motor equipment, on which account I make such leg or legs reducible in length either by making the lower ends thereof completely removable or by hinging or otherwise assembling the same with the balance of the legs so that they may readily be folded out of interfering position.

Figure 1:
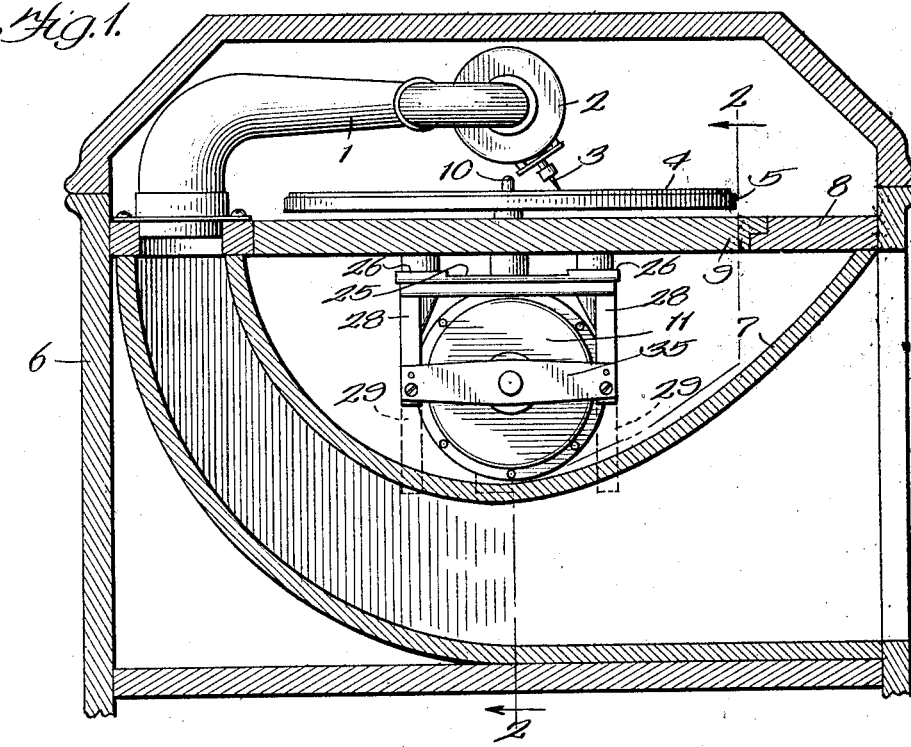
Figure 2:
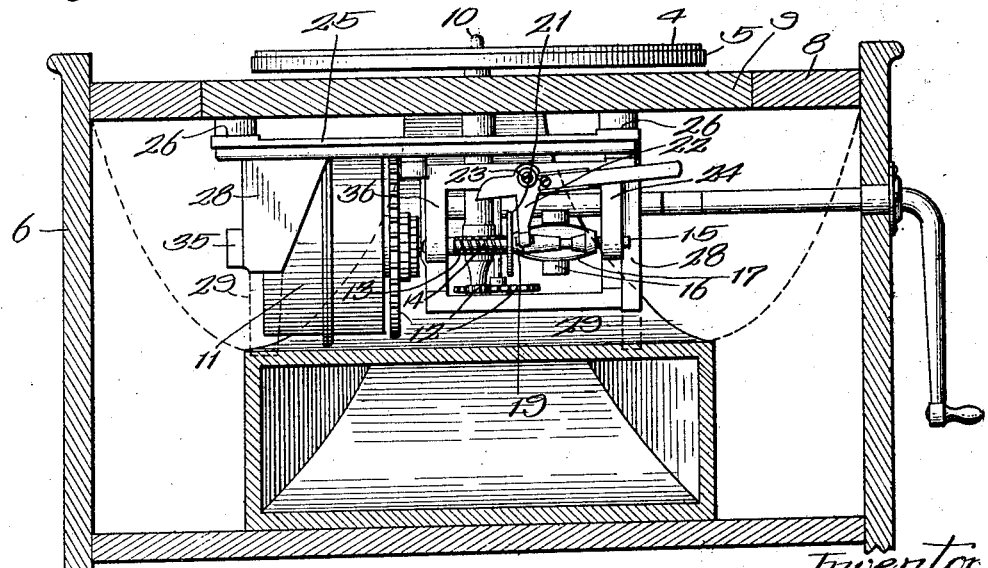

I will explain my invention more fully by reference to the accompanying drawings showing the preferred embodiment thereof and in which Figure 1 is a vertical sectional view of a phonograph structure that includes a spring motor mechanism mounted upon a frame that is constructed in accordance with the preferred embodiment of the invention; Fig. 2 is a vertical sectional view on line 2—2 of Fig 1; Fig. 3 is a perspective view illustrating the structure of my invention in perspective as it might appear when resting upon a work bench preparatory to its incorporation in a phonograph structure; Fig. 4 is a detail view illustrating one construction for making the downward extension of a motor supporting frame reducible in length; Fig. 5 is a view illustrating another form for accomplishing the purpose secured by the structure of Fig. 4; and Fig. 6 is a side view of the parts illustrated in Fig. 5, a folded position of the lower end of one leg being indicated by dotted lines.

Like parts are indicated by similar characters of reference throughout the different figures.

The phonograph illustrated is one of many types that may employ the structure of my invention. The instrument shown includes the tone arm 1 carrying a stylus bearing transmitter 2, the stylus 3 engaging a record 4 upon the turn table 5. Within the cabinet 6 of the phonograph there is a sound transmitting throat 7. A ledge 8 overlies this throat and supports a displaceable mounting board 9 from which the motor is suspended as will appear. The motor which operates the upright turn table shaft 10 includes ribbon-like coiled springs that are contained within a casing 11 and which serve to operate the gearing 12 to drive the shaft 10. The gear wheel 13 is added to the shaft 10 in order that the shaft 10 may drive the worm 14 to rotate the governor shaft 15 for the purpose of operating the centrifugal governor 16 to maintain the speed of the turn table substantially constant. This contrifugal governor is of common form the weights thereof being mounted upon intermediate portions of the resilient strips 17. Each of these resilient strips is mounted at one end upon a sleeve 18 rigidly secured to the shaft 15, the other end of each resilient strip being connected with a collar 19 that is movable along the shaft 15 and with respect to the brake element or pad 20. The collar 19 is in fixed relation to the brake disk or rotatable brake member 21 which engages the pad 20 when the governor shaft 15 reaches a predetermined speed whereby the speed of the turn table shaft 10 is controlled.

In the embodiment of the invention illustrated the brake pad 20 constitutes the normally stationary brake member, this pad, however, being desirably mounted at one end of one arm of the bell crank 22 which is pivotally mounted at 23 to the swinging bracket 24.

The motor supporting frame is preferably in the nature of a casting having a top portion 25 upon which are raised portions 26 at its ends through which screws may be passed into the mounting board 9 when the motor is to be assembled in the phonograph structure. The frame is downwardly extended from its top portion 25 to project below the casing 11, the gearing 12, and the governing mechanism so that when the motor and the frame with which it is assembled after being removed from their shipping boxes may readily be supported upon a work-bench 27 or other support without injury to the motor mechanism and the governor.

In the preferred embodiment of the invention the aforesaid downward extension is preferably inclusive of legs comprising upper portions 28 in permanently fixed relation with the frame top 25 and lower portions 29 in changeable relation to the permanent portions of the legs so that the downward extensions of the motor supporting frame are reducible in length in order that such downward extensions may not interfere with the throat 7. In Fig. 1 the lower sections of the legs are illustrated as being removed, the positions occupied thereby prior to the assembly of the motor with the phonograph being indicated by dotted lines.

In Figs. 1 to 4 inclusive, the lower leg sections 29 are entirely removable, being assembled with the fixed portions of the legs by means of bolts 30, there preferably being positioning pins 31 to prevent the sections 29 from being twisted. In the construction shown in Figs. 5 and 6 the lower leg sections 29 are hinged to the upper leg sections by means of hinge formations 32.

The spring motor has a shaft portion 33 received in the blind hole 34 in the bridge piece 35 that is secured to two legs at one end of the frame. There is a depending shaft bearing 36 for the adjacent shaft end 37 of the spring motor.

There are desirably but three raised portions 26, two at one end of the frame and one at the other so as to insure stable engagement of the frame top 25 with the mounting board 9. Likewise there are preferably two legs at one end of the frame and one at the other so that when the motor is temporarily placed upon a support 27 it will surely be level with respect to that support.

Having thus described my invention I claim as new and desire to secure by Letters Patent the following:—

A spring motor having a mounting frame provided with a top portion and formed with legs extended to terminate below the motor whereby said motor may be supported clear of a support upon which the frame legs are placed, one or more of said legs having the lower end thereof displaceable to avoid interference of the frame with the structure with which the motor is incorporated.

In witness whereof, I hereunto subscribe my name this 30th day of October A. D., 1919.

HENRY G. SAAL.